May 18, 1965  E. E. LOVELL  3,184,216

RECIPROCATING VALVE ASSEMBLY

Filed Aug. 10, 1962

INVENTOR.
ERNEST E. LOVELL

BY *Rudolph L. Lowell*

ATTORNEY

United States Patent Office 3,184,216
Patented May 18, 1965

3,184,216
RECIPROCATING VALVE ASSEMBLY
Ernest E. Lovell, Detroit, Mich., assignor to The Delman Company, Cookeville, Tenn., a corporation of Tennessee
Filed Aug. 10, 1962, Ser. No. 216,115
1 Claim. (Cl. 251—347)

This invention relates to improvements in valve assemblies and is primarily directed to an assembly of valve parts wherein precision workmanship in producing such parts is not essential to the effective operation of the valve without leakage.

The primary object of the invention is to provide a simplified valve assembly wherein a valve body is reciprocated relative to a stationary flexible valve member to effect opening and closing action of the valve.

A more specific object of the invention is to provide a valve assembly including a valve body having therein a flexible valve member in which the valve member performs a dual function of acting as a seal for the valve as well as performing the opening and closing functions of the valve when the valve body is moved relative thereto.

A more specific object of this invention is to provide an improved valve assembly which is economical to manufacture.

Another object of this invention is to provide a valve assembly including a valve body having inlet and outlet ports connected to flexible fluid tubing material wherein the valve body is shifted in a linear manner relative to a fixed valve member for the purpose of opening and closing the passageway between the inlet and outlet ports.

Another object of this invention is to provide a valve assembly which may be simply operated in push button fashion to overcome a normally biased closing action on the part of a portion of the valve assembly.

With the foregoing and other objects in view, the invention resides in the following specification and appended claim, certain embodiments and details of construction of which are illustrated in the accompanying drawings, in which:

Figure 1:
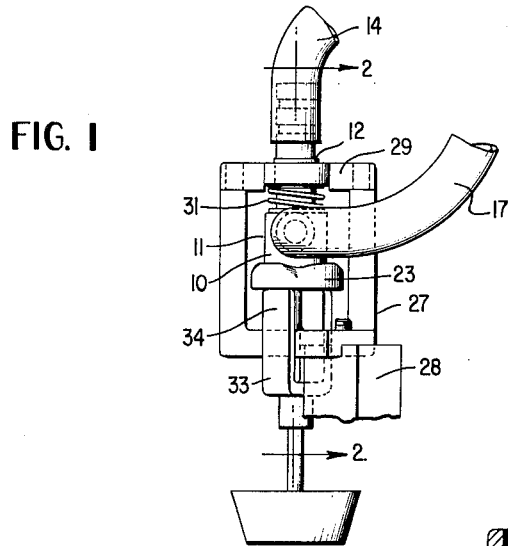
FIGURE 1 is a view in front elevation of the valve assembly comprising the invention.

Referring particularly to the drawings, a valve body 10 having a generally cylindrical body portion 11 is provided with a reduced diameter portion 12 through which an inlet passage 13 leads to a flexible fluid supply line 14. The valve body 10 is further provided with a second reduced body portion 15 accommodating an outlet passage 16 leading to a flexible fluid line 17.

The hollowed interior of the valve body 10 is substantially cylindrical in form. Positioned within the hollowed bore of the body 10 is a valve 18, said valve being of an extremely flexible nature and being constructed preferably of rubber. The valve 18 has a sealing surface 19 which, in the closed position of the valve, abuts the end 20 of the valve body bore and seals off the inlet opening 21. The other terminal end of the valve 18 is provided with a flange 22 which abuts against the outer edge of the valve body 10. A cap retainer member 23 engages the body 10 in fixed relation and thereby clamps the flange 22 of the valve 18 in sealing relationship against the body member 10. The cap member 23 is provided with an opening 24, which opening exposes the outer end of the valve member 18 for a purpose to be described.

The valve member 18 is provided with a generally hollow interior 25 and a reduced diameter inlet opening or bore portion 26.

Generally surrounding the valve body 10 is a frame member 27 which is suitably secured to any stationary member 28. Forming a part of the frame member 27 is a valve guide member 29 having a centrally located bore 30 of substantially the same diameter as the diameter of the reduced body portion 12 of the valve body 10. It is obvious from the drawings that the reduced body portion 12 of the valve body 10 extends through the bore section 30 of guide 29 and is received therein in a sliding fit relationship.

Surrounding the reduced body portion 12 of valve body 10 between the guide member 29 and the cylindrical body portion 11 of valve body 10 is a coil spring 31 which places a bias on the valve body to move the body in such a manner as to place the inlet port 21 firmly against the sealing surface 19 of the valve 18.

Affixed to the frame 27 by any suitable means, and being generally aligned with the inlet opening on the opposite side of said framing assembly, is a valve stem 32 which is provided with an enlarged end portion 32a which completely fills the hollowed interior 25 of the valve 18. In assembly, the valve member opening or bore 26 is stretched sufficiently to be slipped over the enlarged end 32a of the stem 32 whereby the valve 18 will be fixed in position relative to the frame 27.

Figure 2:
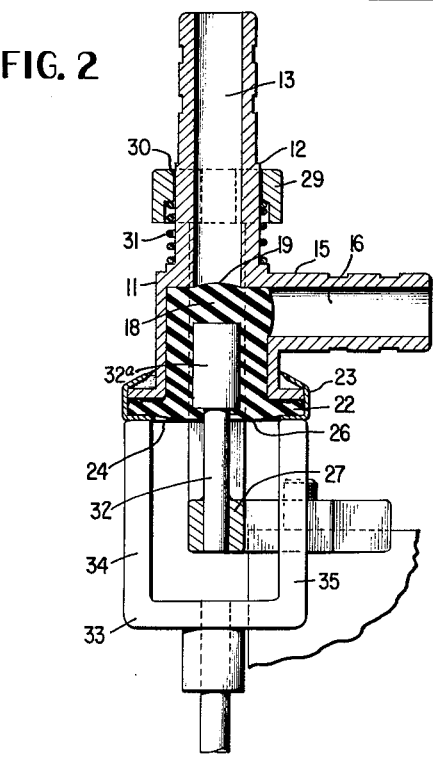
FIGURE 2 is a partially sectioned view taken along the lines 2—2 of FIGURE 1, with the valve being illustrated in the closed position.
Figure 3:
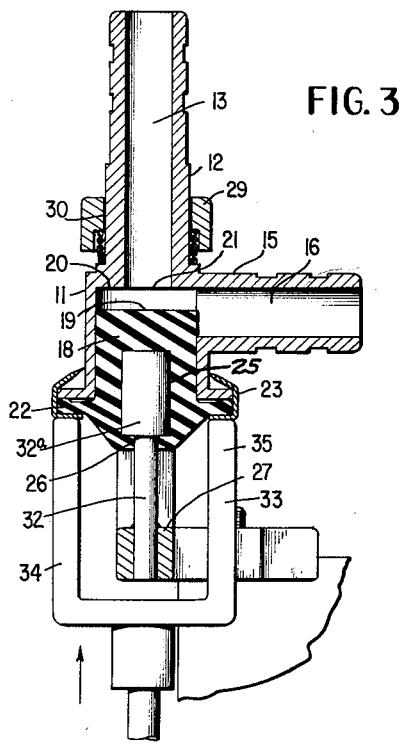
FIGURE 3 is a view similar to FIGURE 2, but illustrating the valve in an open condition.

The external diameter of the body portion of valve 18, before assembly, is somewhat less than the internal diameter of the bore of valve body 10, but after assembly, upon bias by spring 31, the valve substantially fills the bore as illustrated in FIGURES 2 and 3.

An actuator means comprising a yoke 33 having a pair of legs 34 and 35 is utilized to move the valve body. The terminal ends of legs 34 and 35 engage against the cap retainer member 23 and, upon said yoke being depressed by any suitable means such as a push button, cam, or motor actuator, the body 11 will be shifted toward the frame guide member 29. This action removes the inlet port 21 from the sealing surface 19 of the valve 18 to thereby open the inlet port and permit fluid to go from the inlet line 14 to the outlet line 17 through the valve body. The valve body in such movement is depressed against the action of the spring 31 and the resilient flanged area of the otherwise fixedly held valve member 18. The opening 24 and the retainer cap during a depression action of the valve body will permit the central end area of the valve 18 to extend partially through such opening, as shown in FIGURE 3, while the valve body is actually depressing the peripheral edges of the flange 22 toward the guide end of the frame.

It is therefore seen that the valve assembly of the invention requires no precision manufacture and, in fact, the valve 18 is merely a rubber molded part which has a flat sealing surface which is held in abutment with the inlet of the valve by spring pressure and the inherent resiliency or flexibility of the valve itself. Furthermore, no threaded parts or extra seals are required to attain assembly of this relatively simple construction.

Obvious variations of the actual details of construction of the invention are considered to be within the scope of the appended claim.

I claim:

A reciprocating valve assembly comprising a generally cylindrical hollow valve body having a bore section with an outlet port, said valve body formed with tubular means defining an inlet passage having an inlet port open to said bore section, said inlet port and outlet port arranged normal to each other with said inlet port in axial alignment with and of a reduced diameter relative to said bore section, a cylindrical valve guidably positioned within said bore section, said valve being formed of a flexible material such as rubber and including a body engaging flange at one terminal end and an inlet port sealing surface at the other terminal end thereof, an apertured valve cap retainer mounted on the valve body and clamping thereagainst the flange of the valve in a sealing relation, a valve frame surrounding the valve body including a portion guidably receiving said tubular means, a valve stem rigidly secured at one end to the valve frame and extended through said apertured retainer cap for attachment of the opposite end thereof to said flexible valve, resilient means positioned between the body and said guide portion to bias the inlet port against the sealing surface of the valve, and means for moving the valve body relative to the frame against said biasing means to yieldably extend the valve in an axial direction to separate the inlet port from the sealing surface whereby to open the valve.

References Cited by the Examiner

UNITED STATES PATENTS

| | | | |
|---|---|---|---|
| 941,268 | 11/09 | Nolley | 251—340 XR |
| 1,095,647 | 5/14 | Luce | 251—321 |
| 2,360,603 | 10/44 | Ward | 251—331 XR |
| 2,506,837 | 5/56 | Kochner | 251—335.1 XR |

FOREIGN PATENTS 811,527   8/51   Germany.

ISADOR WEIL, *Primary Examiner.*